United States Patent
Kolton et al.

(10) Patent No.: US 8,035,518 B2
(45) Date of Patent: Oct. 11, 2011

(54) SET SCREW TAG HOUSING

(75) Inventors: Chester Kolton, Westfield, NJ (US); Michael Norman, East Brunswick, NJ (US); Robert Whittemore, Montgomery, NY (US)

(73) Assignee: B&G Plastics, Inc., Newark, NJ (US)

( * ) Notice: Subject to any disclaimer, the term of this patent is extended or adjusted under 35 U.S.C. 154(b) by 958 days.

(21) Appl. No.: 11/895,751

(22) Filed: Aug. 27, 2007

(65) Prior Publication Data

US 2008/0061987 A1 Mar. 13, 2008

Related U.S. Application Data

(60) Provisional application No. 60/842,726, filed on Sep. 7, 2006.

(51) Int. Cl.
*G08B 13/14* (2006.01)
*E05B 65/00* (2006.01)
*E05B 73/00* (2006.01)
*F16B 21/00* (2006.01)

(52) U.S. Cl. ............... 340/572.1; 340/572.8; 340/572.9; 340/568.1; 70/57.1; 70/58; 24/704.1; 24/704.2

(58) Field of Classification Search .................. None
See application file for complete search history.

(56) References Cited

U.S. PATENT DOCUMENTS

| | | | | |
|---|---|---|---|---|
| 3,911,534 A | * | 10/1975 | Martens et al. | 70/57.1 |
| 4,012,813 A | * | 3/1977 | Martens et al. | 70/57.1 |
| 4,299,870 A | * | 11/1981 | Humble | 24/704.2 |
| 5,309,740 A | * | 5/1994 | Hansen | 70/57.1 |
| 6,188,320 B1 | | 2/2001 | Kolton et al. | |
| 6,304,184 B1 | | 10/2001 | Kolton et al. | |
| 6,330,758 B1 | | 12/2001 | Feibelman | |
| 6,624,753 B2 | | 9/2003 | Elston | |
| 6,933,847 B2 | * | 8/2005 | Feibelman | 340/572.1 |
| 7,619,519 B2 | * | 11/2009 | Richter | 340/568.8 |
| 7,633,396 B2 | * | 12/2009 | Lynce et al. | 340/572.8 |
| 7,639,133 B1 | * | 12/2009 | Kelsch et al. | 340/545.6 |

* cited by examiner

*Primary Examiner* — Julie Lieu
(74) *Attorney, Agent, or Firm* — Hoffmann & Baron, LLP

(57) ABSTRACT

An electronic tag housing secures an electronic tag to an elongate article. The housing includes a cover and a base positioned over the cover for supporting the tag therebetween. The cover and base define a passageway therebetween for insertable receipt of the elongate article. A pressure plate is movably secured to the cover. The pressure plate is movable into engagement with the elongate article to clamp the article therein.

11 Claims, 3 Drawing Sheets

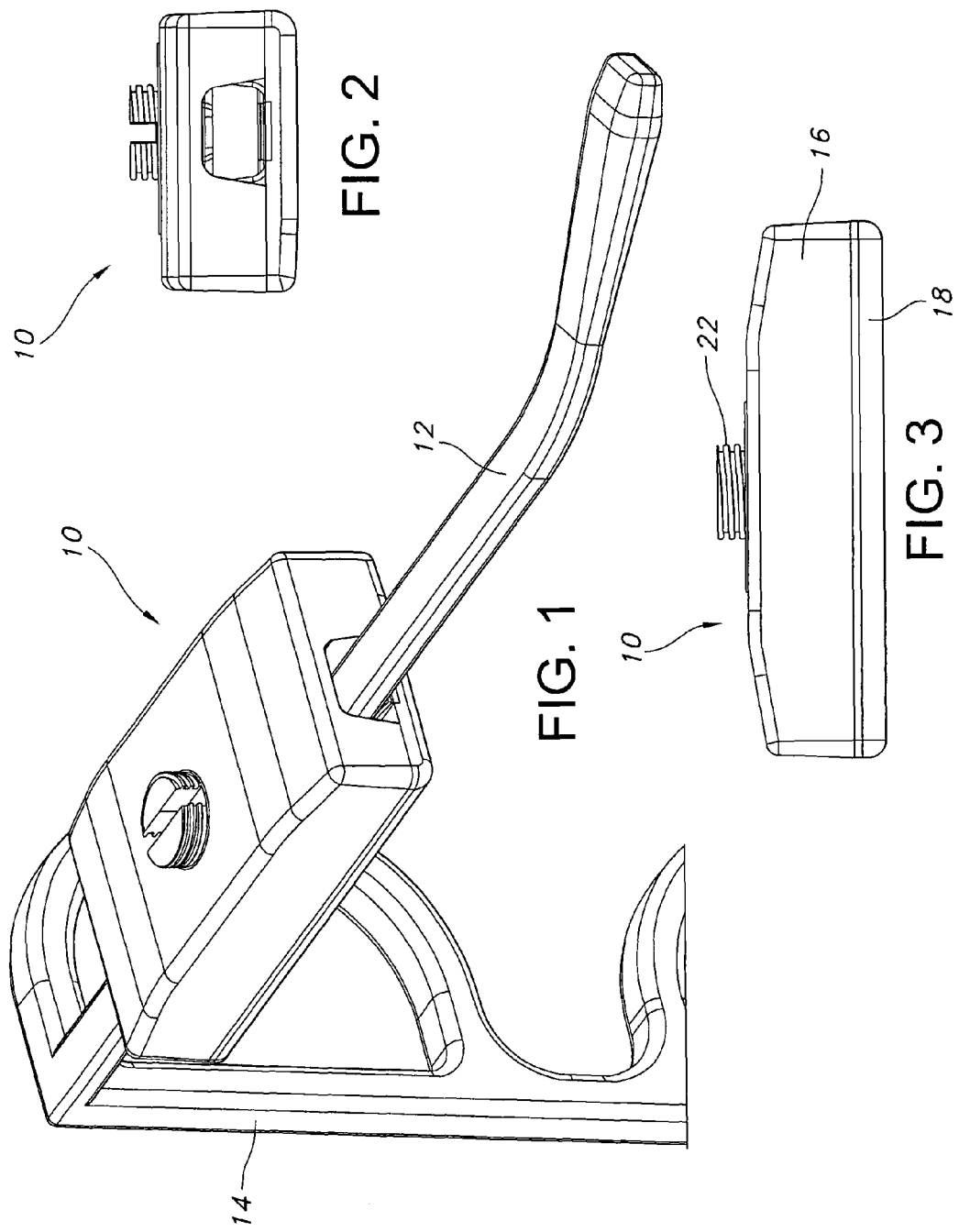

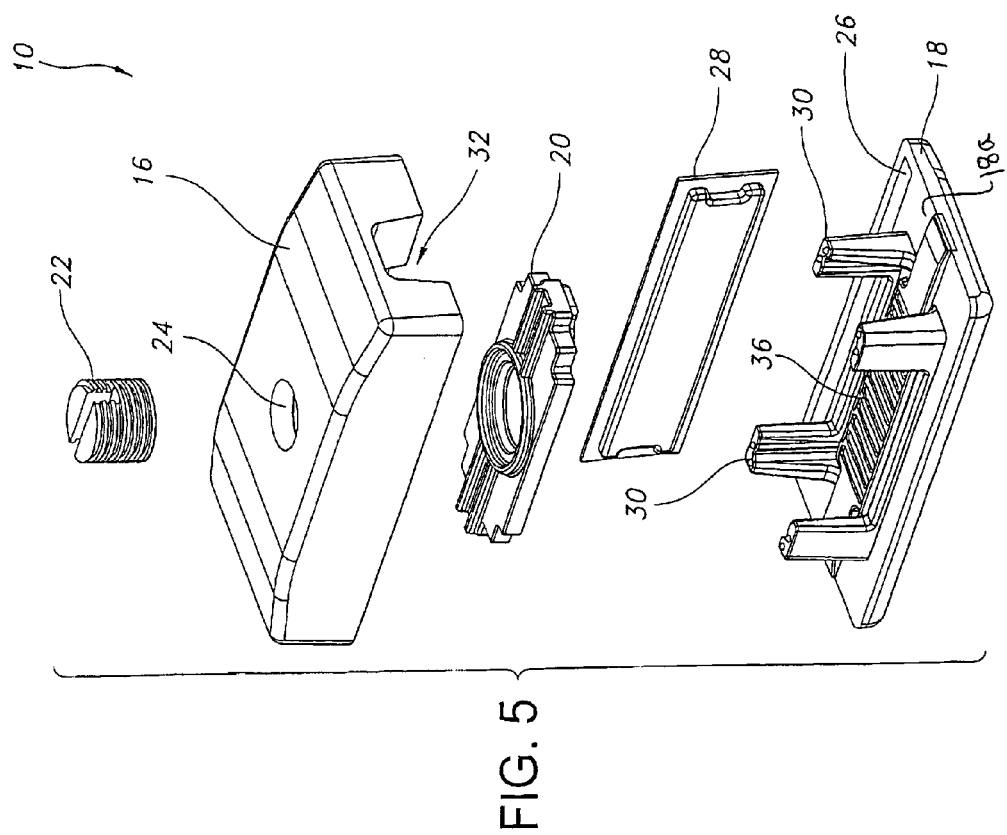
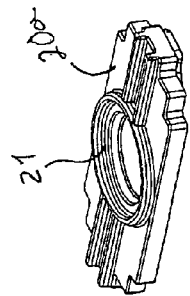
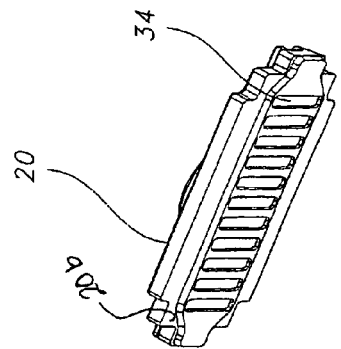

SET SCREW TAG HOUSING

CROSS-REFERENCE TO RELATED APPLICATION

This application claims priority to U.S. Provisional Patent Application No. 60/842,726, filed on Sep. 7, 2006, which is incorporated herein by reference.

FIELD OF THE INVENTION

The present invention relates generally to an electronic tag housing used to support electronic tags. More particularly, the present invention relates to a tag housing which is secured to an elongate item inserted therethrough which it is inserted by use of a set screw.

BACKGROUND OF THE INVENTION

It is widely known to use electronic tags for various purposes. Electronic article surveillance (EAS) tags, as well as radio frequency identification (RFID) tags, are used for purposes such as tracking sales and shipments of products to which they are attached. These tags may also be used to provide theft deterrence to articles to which they are attached.

The efficient use of such electronic tags require the tag to be securely attached to the desired article preventing inadvertent or unauthorized removal therefrom. However, to function effectively in the retail market, it is desirable to have the tag be quickly and efficiently removed from the article so that the purchaser can remove the article from the purchased location, especially when the tags are used in combination with article surveillance.

With certain articles such as articles having elongate portions, it is desirable to insert the tag housing over the elongate portion by sliding the tag housing thereover. Effective means must be provided to secure the tag housing to the elongate article yet permit efficient removal, when necessary.

SUMMARY OF THE INVENTION

The present invention provides an electronic tag housing assembly for attachment to an elongate article. The housing assembly includes a housing which supports the electronic tag. The housing includes a base and a cover positioned over the base for accommodating the electronic tag therebetween. The cover and the base define a passageway therethrough for insertable receipt of the elongate article. A pressure plate is movably secured to the cover within the passageway for movement with respect thereto. The pressure plate is movable towards the cover to clamp around the article inserted within the passageway.

In a method aspect of the present invention, a method of securing an electronic tag to an elongate article is provided. The method includes supporting an electronic tag within a housing. The housing includes a base and a cover defining an elongate passageway therebetween. A pressure plate is provided and is movably secured to the housing. The elongate article is inserted into the passageway and the pressure plate is urged into engagement against the elongate article.

In a preferred embodiment of the present invention, the pressure plate is secured to the cover by a screw attached to an upper surface of the pressure plate and accessible through the cover to effect movement of the pressure plate. Further, the pressure plate may include an elastomeric pad for engagement with the article to secure the article within the tag housing.

BRIEF DESCRIPTION OF THE DRAWINGS

FIG. 1 is a perspective showing of the tag housing assembly supported to a temple piece of an eyeglass.

FIGS. 2 and 3 are top end and side views respectively of the tag housing assembly of FIG. 1.

FIG. 5 is an exploded prospective view of the tag housing assembly of FIG. 1.

FIGS. 6 and 7 are top and bottom views respectively of the pressure plate employed in the tag housing assembly of FIG. 1.

DETAILED DESCRIPTION OF THE PREFERRED EMBODIMENTS

Figure 4:
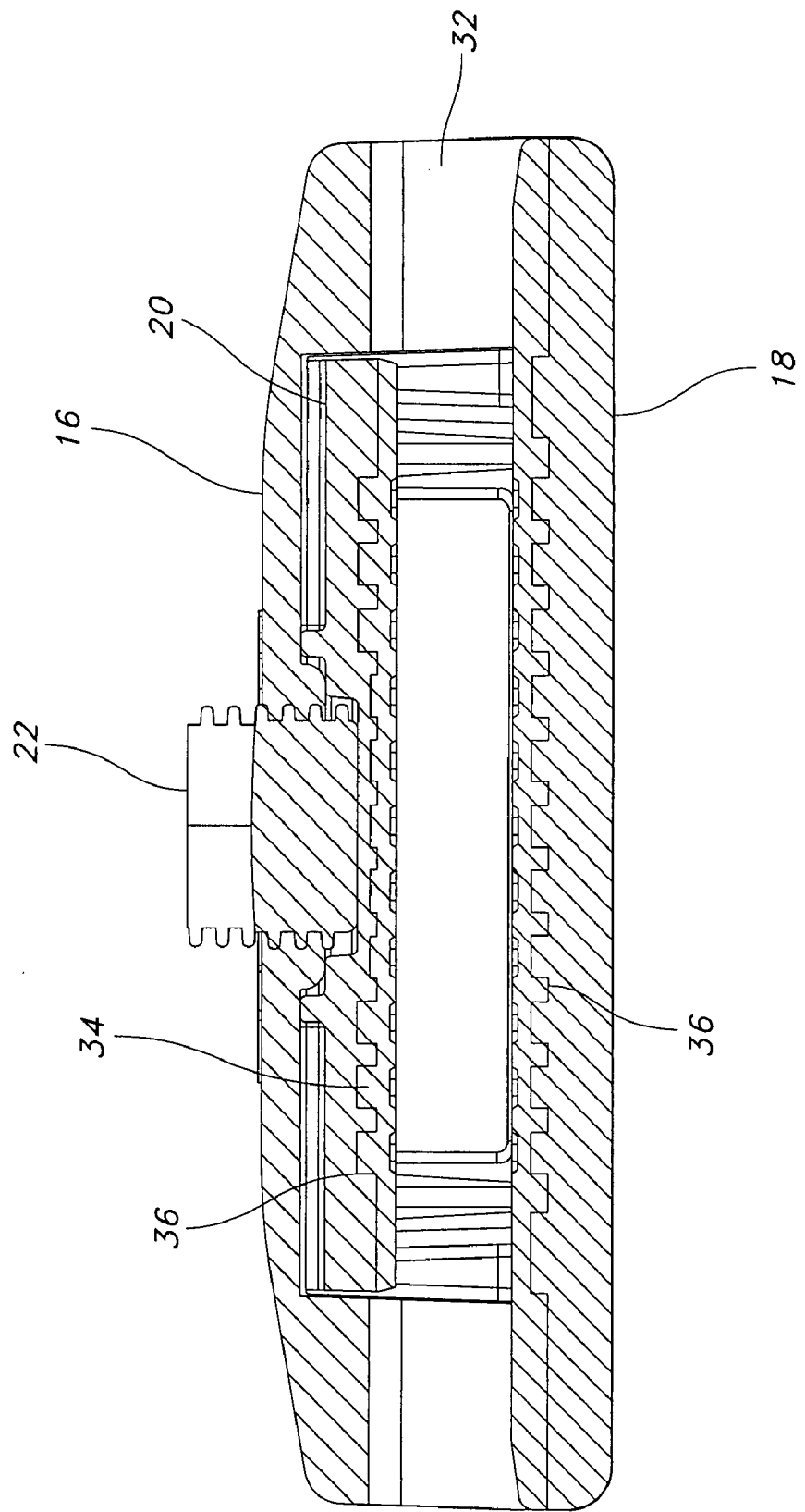
FIG. 4 is an enlarged transverse cross-sectional view of the tag housing assembly of FIG. 1.

As shown in FIG. 1, the tag housing assembly 10 is designed to be supported over an elongate article such as the temple piece 12 of eyeglasses 14. While the present invention may be used with eyeglasses, it of course may be appreciated that the present invention may be used with other articles.

Referring more specifically to FIGS. 4 and 5, the tag housing assembly 10 includes a top or cover 16, a bottom or base 18 to which the cover is attachably supported and a pressure plate 20 which is supported therebetween. The pressure plate 20 may be formed of a rigid plastic or similar material. The pressure plate 20 is movably supported to the cover 16 by use of a set screw 22 which is extendible through an internally threaded opening 24 of cover 16. The set screw 22 engages the pressure plate 22 by being captively seated in a receiving opening 22a (FIG. 6) outside upper surface 20a. Thereafter, the pressure plate 22 is movable upon threaded movement of the set screw 22 in the threaded opening 24 of cover 16.

The base 18 includes a slot 26 for supporting electronic tag 28. The tag may be an EAS or RFID tag. The base 18 also includes plurality of upstanding guide rails 30 which support and align the cover 16 with respect to base 18. The cover 16 includes an elongate passageway 32 therethrough which insertably accommodates, for example, the temple piece 12 of eyeglasses 14.

As best shown in FIG. 7, the pressure plate 20 includes on the lower surface 20b thereof a pad 34 formed of thermoplastic elastomer (TPE). This pad 34 is overmolded with the pressure plate 20 during manufacture. An inner surface 18a of base 18 also includes a resilient pad 36 formed of TPE which is in facing opposition to pad 34 when the pressure plate is supported by cover 16 over base 18.

As shown in FIG. 5, the tag housing assembly 10 is assembled by placing the tag 28 within the slot 26. Thereafter, the cover 16 is positioned over base 18 and maybe secured thereto by a variety of techniques including ultrasonic welding. The pressure plate 20, supported by the set screw 22, is movably supported with respect to the cover. With the set screw 22 in the up position, the pressure plate 20 is raised against the undersurface of cover 16. In this position, the tag housing assembly may be inserted over the temple piece 12 of eyeglasses 14. Thereafter, the set screw is threaded downwardly to urge the pressure plate 20 down on to the temple piece 12, securing the temple piece between the opposed TPE pads 34 and 36.

The tag housing assembly 10 is thus secured about the temple piece 12 and cannot be easily removed for example by sliding the housing along the temple piece as the TPE pads 34 and 36 make frictional engagement with the temple piece 12. Removal of the tag housing assembly 10 may only be accomplished by employing a tool such as a screwdriver (not shown)

to back the set screw 22 off, thereby raising the pressure plate 20 allowing the tag housing to be removed from the temple piece 12.

Various changes to the foregoing described and shown structures would now be evident to those skilled in the art. Accordingly, the particularly disclosed scope of the invention is set forth in the following claims.

What is claimed is:

1. An electronic tag housing assembly for attachment to an elongate article comprising:
    a housing; and
    an electronic tag supported by said housing;
    said housing including:
    a base;
    a cover attachably supported over said base accommodating said electronic tag therebetween;
    said attached cover and said base defining a passageway therethrough for insertable receipt of said elongate article;
    a pressure plate movably secured with respect to said cover between said cover and said base; said pressure plate being urged within said passageway toward said base to frictionally clamp about said article within said passageway; wherein said pressure plate is secured to said cover by a screw attached to an upper surface of said pressure plate and accessible through said cover to effect movement of said pressure plate.

2. An electronic tag housing assembly of claim 1 wherein said pressure plate includes a clamping surface opposite said upper surface for engagement with said article.

3. An electronic tag housing assembly of claim 2 wherein said clamping surface supports an elastomeric pad for resilient engagement with said article.

4. An electronic tag housing assembly of claim 3 wherein said base includes a further elastomeric pad supported on said base in facing opposition to said clamping member for resilient engagement with said article.

5. An electronic tag housing assembly of claim 4 wherein said pads are formed of thermoplastic elastomer.

6. An electronic tag housing assembly of claim 1 wherein said pressure plate is formed of a rigid material.

7. An electronic tag housing assembly of claim 1 wherein said cover is secured to said base.

8. An electronic tag housing assembly of claim 7 wherein said cover is ultrasonically secured to said base.

9. An electronic tag housing assembly of claim 5 wherein said pads are overmolded.

10. A method of securing an electronic tag to an elongate article comprising the steps of:
    supporting said electronic tag within a housing, said housing including a base and a cover defining a passageway therebetween;
    movably securing a pressure plate with respect to the cover between said base and said cover with a set screw, said set screw being attached to said cover and accessible through the cover;
    inserting said elongate article through said passageway of said housing; and
    urging said pressure plate away from said cover towards said base and in frictional engagement against said elongate article.

11. A method of claim 10 wherein said pressure plate further includes an elastomeric pad, said elastomeric pad being engageable with said article upon said urging of said pressure plate.

* * * * *